Patented July 6, 1926.

1,591,662

UNITED STATES PATENT OFFICE.

EDWIN C. ECKEL, OF WASHINGTON, DISTRICT OF COLUMBIA.

CEMENT AND PROCESS OF MAKING SAME.

No Drawing. Application filed March 31, 1926. Serial No. 98,931.

A difficulty in the earlier alumina cement processes invented by Jules Bied (patented as Lafarge French #390290, Daher U. S. #1004380 and Mellersh-Jackson British #8675 of 1909) and by E. C. Eckel, patented as U. S. #1536381 and #1536382 arises from the fact that the treatments involved in those processes do not effect any reduction in the silica of the charge, so that in order to produce an alumina cement low in silica (which is desirable) it is necessary to start with very low-silica raw materials. In the process now described this difficulty is obviated by carrying out the fusion in a strongly reducing atmosphere and in the presence of sufficient free carbon to reduce to the metallic state not merely the bulk of the iron oxide present in the raw materials, but also such portion of the silica as may be desired.

In carrying out this process, a mixture of suitable raw materials, for example iron ore, limestone and bauxite—or iron ore, limestone and high alumina clays—is fused in a blast or electric furnace. Sufficient carbon is added, in the form of coke, charcoal, etc., not merely to supply the heat necessary for smelting but to reduce the iron oxide and such portion of the silica as may be desired. The two reduced metals unite in the melting zone to form ferro-silicon—which is in itself a highly valuable product—thus sharply reducing the costs of the alumina cement itself, which is made from the slag.

The raw materials possible are numerous, and may be combined in many ways. The essential features of calculating the charge are:

(1) That the lime and alumina present must be in such relative proportions that the chemical compound $5CaO,3Al_2O_3$ may be formed.

(2) That, over and above any carbon required for smelting, there be added sufficient free carbon to reduce the iron oxide and silica to such extent that not over 5% of ferrous oxide and not over 15% of silica remain in the slag.

(3) That there must be sufficient iron present, relative to the silica to be reduced, so that the economic formation of ferro-silicon (or of a high-silicon pig) is possible. For blast furnace use such an economic ferro-silicon may carry from 10% to 25% of silicon with from 90% to 75% metallic iron; while if the electric furnace be employed the ferro-silicon may economically carry as much as 25 to 45% of silicon as against 75% to 55% of iron.

By use of the process herein described, it is technically and economically possible to utilize bauxites high in silica, as well as other highly siliceous materials not heretofore employed such as siliceous diaspore clays, and even clays of the type of kaolinite and halloysite, heretofore unuseable by any process ever employed or even suggested for use. An incidental advantage is that the presence of the high percentages of iron and of free or excess carbon makes it easily possible to produce fused lime-alumina cements whose essential component is the compound $5CaO,3Al_2O_3$, giving higher strengths and greater durability than the mono-calcic compounds previously employed in the Daher, Mellersh-Jackson and Lafarge processes.

The presence of unreduced silica results in the formation of a relatively small amount of lime silicate in the cement slag; and at times a still smaller percentage of ferrous silicate is similarly produced, whereby the resulting cement composition will be approximately $$6CaO,3Al_2O_3,SiO_2$$

or $$6CaO,3Al_2O_3,2SiO_2,FeO$$

I claim:

1. The process of making alumina cement and ferro-silicon by the fusion of a mixture of raw materials containing alumina, iron oxide, silica and lime, in the presence of sufficient free carbon to reduce most of the iron and sufficient of the silicon so that the resulting slag will be of the approximate chemical formula $6CaO,3Al_2O_3,SiO_2$; separating the ferro-silicon and the slag; and cooling and grinding the latter to cement.

2. The process of making cement and ferro-silicon comprising the fusion of a mixture of materials containing alumina, iron, silica and lime, in the presence of sufficient free carbon to form ferro-silicon.

3. The process of making cement and ferro-silicon comprising the fusion of a cement forming mixture containing iron and silica in the presence of sufficient free carbon to form commercial ferro-silicon and cement slag.

4. The process of making cement and ferro-silicon comprising the fusion of a cement forming mixture containing iron and silica in the presence of sufficient free carbon to form high-silicon pig iron and cement slag.

In testimony whereof, I affix my signature.

EDWIN C. ECKEL.